United States Patent [19]

Lee

[11] Patent Number: 5,345,472
[45] Date of Patent: Sep. 6, 1994

[54] METHOD AND APPARATUS FOR RECEIVING AND DECODING COMMUNICATION SIGNALS IN A CDMA RECEIVER

[75] Inventor: Edward K. B. Lee, Sunrise, Fla.

[73] Assignee: Motorola, Inc., Schaumburg, Ill.

[21] Appl. No.: 100,237

[22] Filed: Aug. 2, 1993

[51] Int. Cl.[5] .............................................. H04K 1/00
[52] U.S. Cl. ........................................................ 375/1
[58] Field of Search ........................................... 375/1

[56] References Cited

U.S. PATENT DOCUMENTS

| | | | |
|---|---|---|---|
| 5,136,612 | 8/1992 | Bi | 375/1 |
| 5,157,686 | 10/1992 | Omura et al. | 375/1 |
| 5,166,952 | 11/1992 | Omurg et al. | 375/1 |
| 5,204,874 | 4/1993 | Falconer et al. | 375/1 |
| 5,224,122 | 6/1993 | Bruckert | 375/1 |

OTHER PUBLICATIONS

Monzingo, R. A. and Miller, T. W., "Introduction to Adaptive Arrays," Wiley–Interscience Publication, John Wiley & Sons, New York.

*Primary Examiner*—David C. Cain
*Attorney, Agent, or Firm*—Robert S. Babayi; M. Mansour Ghomeshi

[57] ABSTRACT

In an adaptive CDMA receiver (20), a DS-SS received signal and a reference signal are equalized by minimizing the error between them the received signal includes a desired DS-SS communication signal comprising binary bits coded with spreading chip sequences. The received signal is sampled at a chip rate to produce sampled received signals which are correlated with each other. The received samples are de-correlated by employing an orthogonal transformation algorithm to provide de-correlated elements corresponding to the received samples. The equalization process is accelerated by minimizing the error based on the de-correlated elements.

11 Claims, 5 Drawing Sheets

METHOD AND APPARATUS FOR RECEIVING AND DECODING COMMUNICATION SIGNALS IN A CDMA RECEIVER

TECHNICAL FIELD

This invention relates in general to the field of communication systems and more particularly to a direct sequence code division multiple access (DS-CDMA) communication system.

BACKGROUND

Code division multiple access (CDMA) communication systems are used extensively in satellite communications with military and commercial applications. These systems are also known as CDMA spread spectrum communication systems because the communicated information is spread over a wide allocated frequency spectrum and the frequency spectrum can be re-used multiple times.

Because CDMA modulation techniques are inherently more susceptible to fading conditions generally present at the terrestrial and land mobile environments, their application has been limited to satellite communications. However, with recent advancements in digital signal processing capability, CDMA communication systems are becoming increasingly popular in terrestrial land mobile environments. For example, recent developments have allowed CDMA systems to be used in cellular telephone environments. In general, there are two types of CDMA communication systems. One is known as a frequency hopping CDMA system where the wide allocated spectrum is divided into a substantial number of narrower frequency bands, wherein an information signal is switched or "hopped" over these frequency bands in accordance with a predetermined code. The other CDMA system is known as a direct sequence CDMA communication system (DS-CDMA) where the user information signals, in the form of binary bits, are spread over the allocated frequency spectrum by combining them with spreading codes known as pseudorandom noise (PN) codes. The spreading code comprises a predetermined sequence of binary states known as chips. Conventionally, the CDMA transmitters produce DS-SS communication signals by multiplying user information bit sequences by the spreading chip sequences which are identified with particular receivers. In typical CDMA communication systems, the receivers have prior knowledge of the spreading chip sequences directed at them and decode the DS-SS communication signal based on the known spreading chip sequences.

CDMA receivers, in addition to receiving a desired DS-SS signal, also receive multiple-access DS-SS interfering signals. When there is a large power disparity between the desired signal and the interfering signals, non-zero cross-correlations among the spreading sequences give rise to a phenomenon known as the "near-far" problem. In near-far situations, higher power interfering signals overwhelm the lower power desired signal significantly, thus degrading reception quality at the receiver. One conventional approach to improving the near-far problem uses a power control scheme where the powers from the receivers are fed back to control the interfering transmitter's power as to remove the power disparity. In another solution, PN codes are constructed to be orthogonal to each other. Orthogonal codes produce zero cross-correlation over a predetermined time interval among the desired and interfering chip sequences. As such, interfering signals with orthogonal chip sequences become suppressed during the demodulation process at the receivers.

A more recent approach proposes an adaptive despreading or demodulation process. In an adaptive CDMA system, the receiver is enabled to suppress multiple access interference using adaptive equalization methods. The equalization methods utilize minimum mean square error (MMSE) criterion, whereby a transmitted training bit sequence coded with a spreading chip sequence is equalized with an uncoded reference sequence. In such a system, CDMA transmitters transmit a training bit sequence and the receivers adaptively determine, based on the training sequence, the despreading codes by converging or minimizing the error between the received training bit sequence and the reference bit sequence. Adaptive determination of the despreading chip sequence and suppression of multiple access interference allows a significant number of users to communicate with each other over a spread spectrum channel without requiring prior knowledge of system parameters or power control mechanism.

For adaptive implementation of interference suppression based on the MMSE criterion, either one of the least mean square (LMS) or recursive least mean (RLS) algorithms may be employed. These algorithms utilize mathematical computation and matrix operations to minimize the error between the received training sequence and the reference bit sequence. However, the LMS algorithm is known to have a slow convergent rate when an interfering signal is significantly stronger than the desired signal. On the other hand, the recursive least square (RLS) algorithm has a faster convergent rate than the LMS algorithm, and the convergent rate of the former algorithm does not depend on the ratio of interfering signal to the desired signal. However, the RLS algorithm cannot be used in the DS-CDMA case when the number of transmitters is less than the number of chips and noise power is relatively small with respect to the signal power. These conditions produce a received input correlation matrix with zero or near-zero eigen values. An input correlation matrix is defined as a weighted sum of matrix produced by the product of an input vector by its own transposed vector. These zero or near-zero eigen values cause an eventual divergence in the error minimization process using RLS algorithm.

In mobile communication environments, it is required to quickly track varying channel characteristics and to provide a fast communication links. As explained above, the conventional LMS approaches for converging and minimizing the error between the reference signal and the received signal are time consuming. Therefore, there exists a need for accelerating adaptive equalization process, whereby error minimization could be achieved in a significantly shorter period of time than is achievable by conventional methods which use RLS and LMS algorithms.

SUMMARY OF THE INVENTION

Briefly, according to the invention, a CDMA receiver incorporates a method and an apparatus for adaptively decoding DS-SS communication signals by minimizing error between a received DS-SS signal and a reference signal. The received signal includes a desired signal comprising binary bits coded with a spreading chip sequence. The received signal is sampled at the chip rate to produce received samples which are correlated with each other. The received samples are de-correlated by employing an orthogonal transformation algorithm to provide de-correlated elements corresponding to said received samples. The error is minimized based on the de-correlated elements, using either one of LMS or RLS algorithms.

DETAILED DESCRIPTION OF THE PREFERRED EMBODIMENT

Figure 1:
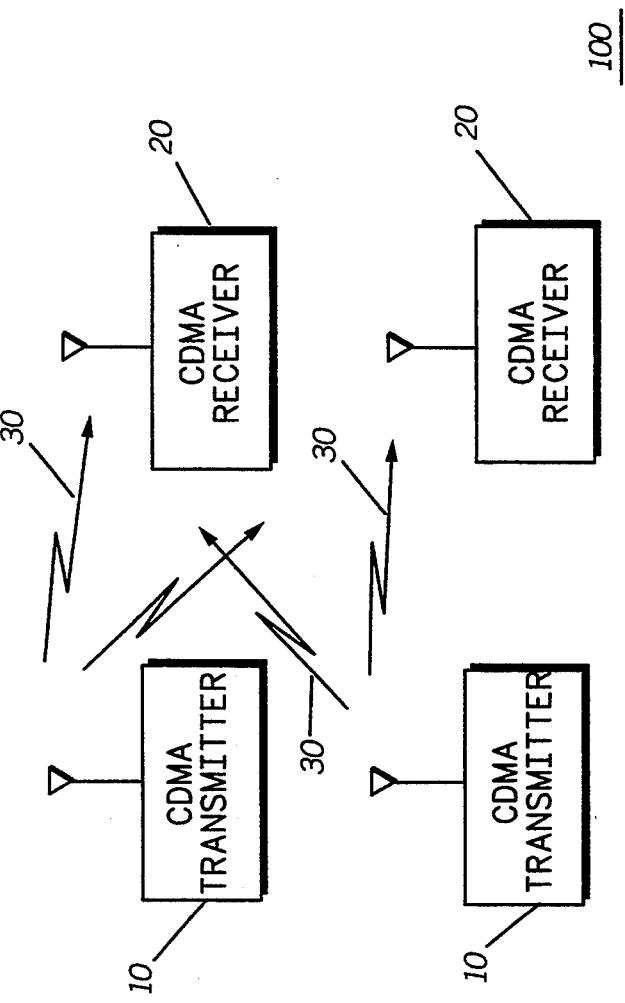
FIG. 1 is a diagram of a CDMA communication system.

While the specification concludes with claims defining the features of the invention that are regarded as novel, it is believed that the invention will be better understood from a consideration of the following description in conjunction with the drawing figures.

Referring to FIG. 1, a communication system 100 embodying the principles of the present invention is shown. The communication system 100 includes a plurality of CDMA transmitters 10 which transmit direct sequence spread spectrum (DS-SS) communication signals 30. The DS-SS communication signal 30 includes a baseband desired signal comprising binary bits coded with spreading chip sequence. The communication system 100 also includes a plurality of CDMA receivers 20 which receive the desired transmitted communication signals 30 along with other multiple access interfering signals from other CDMA transmitters. As such, the received communication signal, in addition to the desired signal, also includes multiple-access interference signal and noise. The received signals at the receivers 20 may be represented mathematically by:

$$R = \sum_{k=1}^{L} \sqrt{g_k} \ d_k P_k + N_n \qquad (1)$$

where $g_k$, $d_k$, and $P_k$, respectively, represent the received power level of the kth user signal, the kth user data bit, the kth user spreading vector. $N_n$ denotes a zero mean Gaussian random noise. In Equation 1, L transmitters, including a desired transmitter, are assumed to be present, $P_1$ is assumed to represent the desired signal spreading sequence (or vector), and $d_1$ is the desired data bit which, as described later, takes on the value of either 1 or −1. Note that upper case characters are used to denote a vector or matrix.

The communication system 100 is an adaptive CDMA communication system whereby a despreading chip sequence is adaptively determined. The determined despreading chip sequence suppresses the multiple access interfering signals and decodes the desired signal. As described later in detail, the receiver 20 determines the despreading chip sequence or vector during a training interval by minimizing the error between the received signal and a reference signal, which corresponds to the desired signal. The error is minimized by minimizing the mean squared error (MSE) at the receiver 20 which is described as:

$$MSE = E|(W^T R - d_1)^2| \qquad (2)$$

Where E refers to averaging operator and W is the receiver's despreading vector. The vector W is a despreading vector which despreads the received DS-SS communication signal and minimizes MSE.

It should be noted that the adaptive error minimization during training is performed asynchronously, i.e., without bit timing or chip timing synchronization of the receiver and the transmitter. This is because performing synchronization of any kind in the presence of interfering signals is close to impossible. Thus, a redundant non-alternating training bit sequence is transmitted to circumvent the need for synchronization while the despreading chip sequence is being determined during the training interval.

Figure 2:
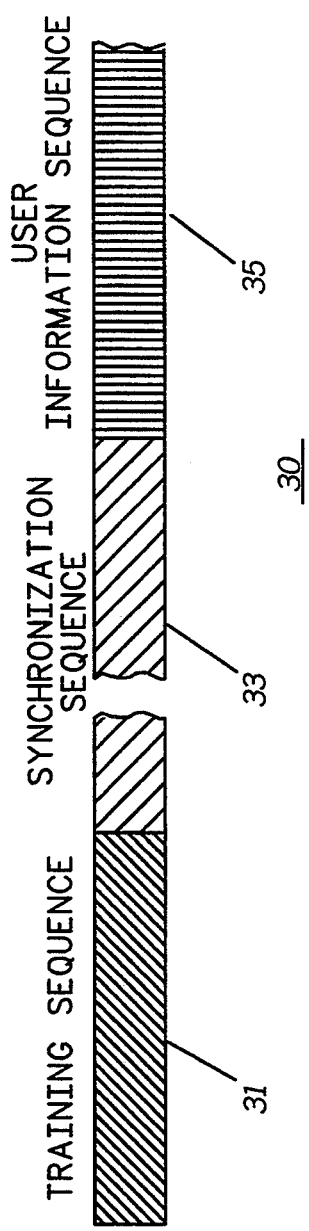
FIG. 2 is timing diagram of a DS-SS communication signal according to the present invention.

Referring now to FIG. 2, a timing diagram of a desired transmitted DS-SS communication signal 30 from the transmitter 10 of FIG. 1 is shown. The DS-SS communication signal 30 comprises a string of radio frequency modulated bits which are coded with a desired spreading chip sequence. The bits and the chips are binary signals assuming one of two states of +1 and −1 represented by voltage potentials of $V_{+1}$ and $V_{-1}$ respectively. The $V_{+1}$ and $V_{-1}$ potentials are of equal magnitude but opposite polarity. At the start of the DS-SS signal 30, a redundant training sequence 31 is transmitted, which is used by the receiver 20 to adaptively determine despreading chip sequence. In the preferred embodiment of the invention, the training bit sequence comprises a predetermined redundant bit sequence having non-alternating and continuous bit states, such as a sequence of consecutive +1 bit states. The training sequence 31 is followed by a transmitter synchronization sequence 33 which is used to synchronize receiver and transmitter bit timing. Preferably, the synchronization of the receiver and the transmitter follows the training interval because the adverse effects of the interfering signals are cancelled at this stage, thus allowing for synchronization to take place. The synchronization of the receiver and transmitter is well known and may comprise auto-correlation and cross-correlation routines. Following the transmitter bit timing sequence 33, a user information sequence 35 comprising user generated data is transmitted. The user-generated data may, for example, be digitized voice or raw binary data for use in a computing device.

Figure 3:
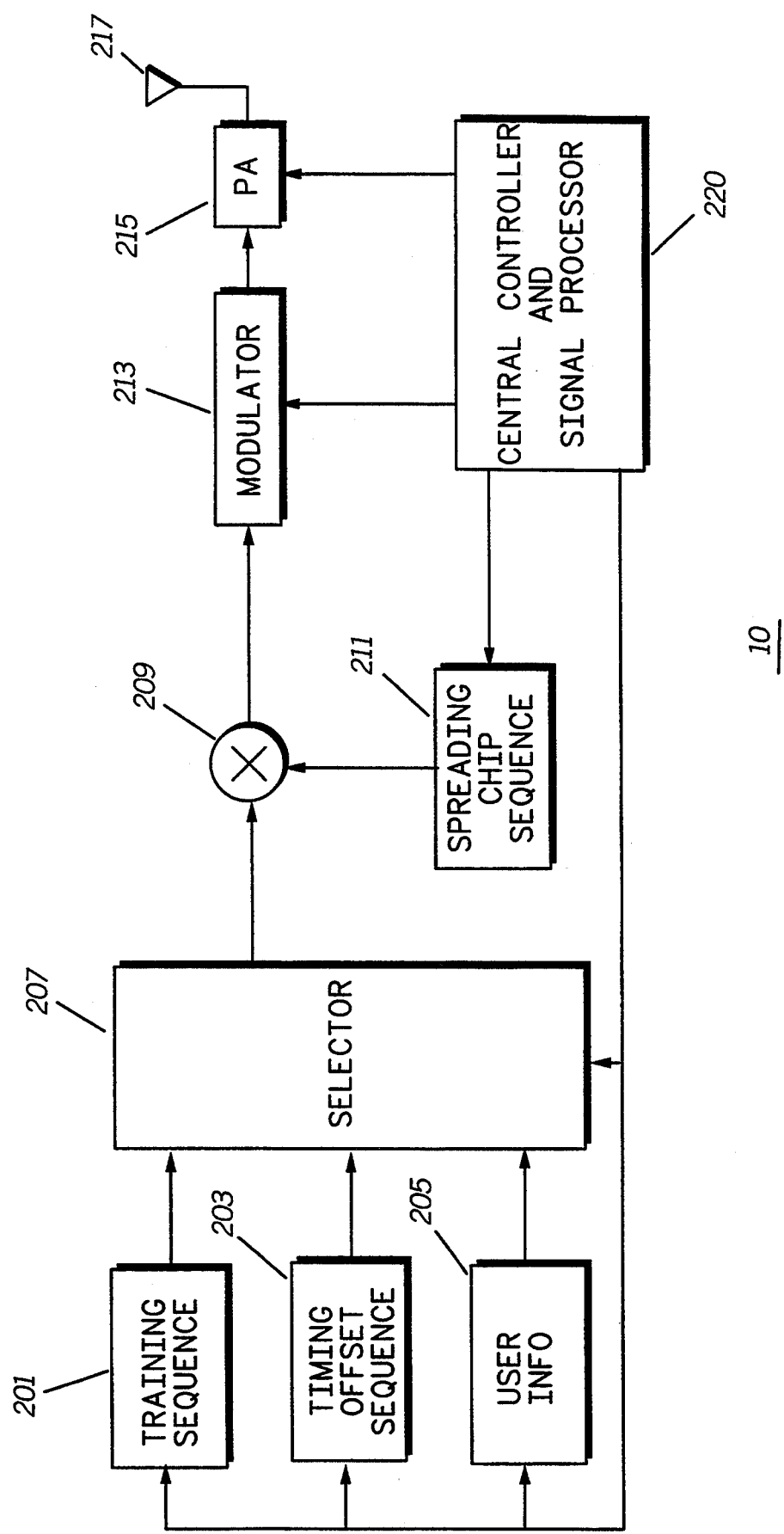
FIG. 3 is a block diagram of a CDMA transmitter used in communication system of FIG. 1.

Referring now to FIG. 3, a blocked diagram of the CDMA transmitter 10 is shown. The CDMA transmitter 10, includes a central controller and signal processor block 220 which controls the entire operation of the transmitter 10, including signal processing necessary for modulating and generating the spreading chip sequence. The transmitter 10, includes a training sequence block 201 which generates the predetermined training sequence. The transmitter 10 also includes a transmitter synchronization sequence generator block 203 which generates the transmitter bit timing sequence following the training sequence. Finally, a user information sequence block 205 provides user information in the form of binary bit sequences. The user information may originate from a variety of sources, such as from a voice coder which receives voice information from a microphone, or it may comprise raw data information generated from a computing device. A selector block 207, under the control of the central controller and processor block 20, provides for selecting one of the training, bit timing or user information sequences in proper order and applies it to a multiplier 209. A spreading chip sequence generator block 211 generates the spreading chip sequence to be combined with the bit sequence to be transmitted to the receiver. Preferably, the generated spreading chip sequence comprises well-known gold PN codes having desirable cross-correlation and auto-correlation properties. The spreading chip sequence has a predetermined number of chips (n) for coding each bit of the transmission sequences. The multiplier 209 multiplies one of the transmission sequences by the spreading chip sequence and applies it to a modulator 213. Modulator 213 may comprise a number of well-known binary signal modulators, such as binary phase shift keying (BPSK) or quadrature phase shift keying (QPSK) modulators. Output of the modulator 213 is applied to a power amplifier 215 which amplifies the modulated signal and applies it to an antennae 217 for transmission. It may be appreciated that the block 220 and some of the other blocks described in conjunction with transmitter 10 may be implemented utilizing one or more of the well-known digital signal processors, such as the DSP 56000 series manufactured by Motorola, Inc.

Figure 4:
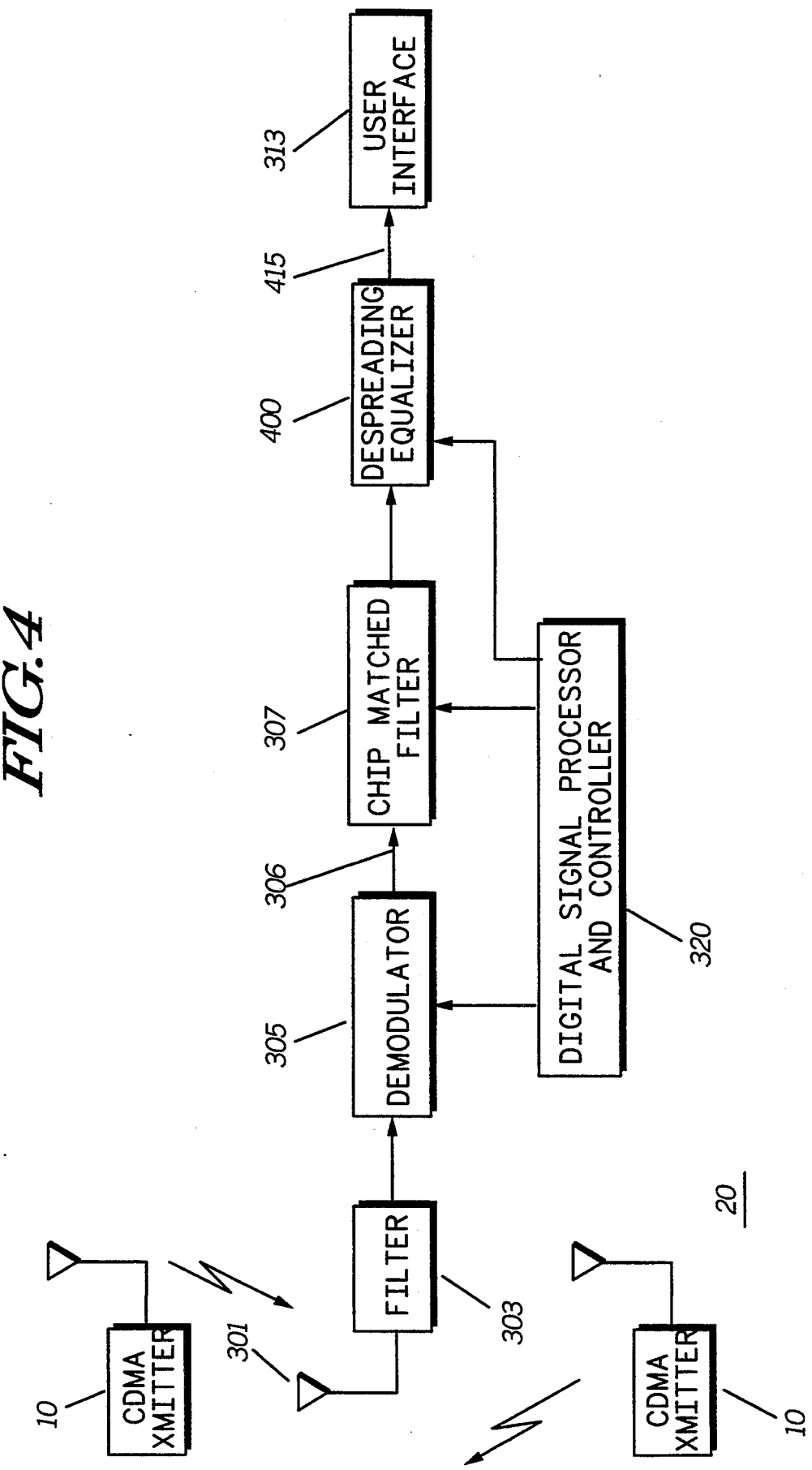
FIG. 4 is a block diagram of a CDMA receiver according to the present invention.

Referring now to FIG. 4, the block diagram of the CDMA receiver 20 is shown. The receiver 20 receives the received communication signal which includes the desired DS-SS communication signal as contaminated by the interfering DS-SS signals and noise. The received communication signal is received at the antennae 301 and is applied to a preselector filter 303 which provides the initial receiver selectivity. The filtered signal is applied to a well-known baseband demodulator 305. The baseband demodulator 305 comprises a well-known demodulator that demodulates the communication signal in accordance with the modulation scheme used in the transmitter 10 to provide a baseband signal 306. The baseband signal 306 is applied to a well-known chip matched filter block 307. The chip matched filter comprises a well-known integrate-and-dump filter block where the received DS-SS communication signal is sampled and integrated at chip rate and the result is dumped at the end of each chip interval. The output of the chip matched filter is applied to a despreading equalizer 400 which, based on the training sequence, adaptively determines the despreading chip sequence vector W. As described later in detail, the despreading equalizer provides despreading chip vector W by adaptively equalizing the received signal with an uncoded pre-stored reference signal corresponding to the training bit sequence. A signal processor and controller block 320 performs all necessary signal processing requirements for the receiver 20. The equalizer 400 despreads the DS-SS communication signal 306 and provides a decoded communication signal at its output (415). The decoded communication signal is applied to a user interface block 313 which may comprise one of a number of user interface devices such as a speaker, a computing device, a data display or a fax or voice mail machine.

Figure 5:
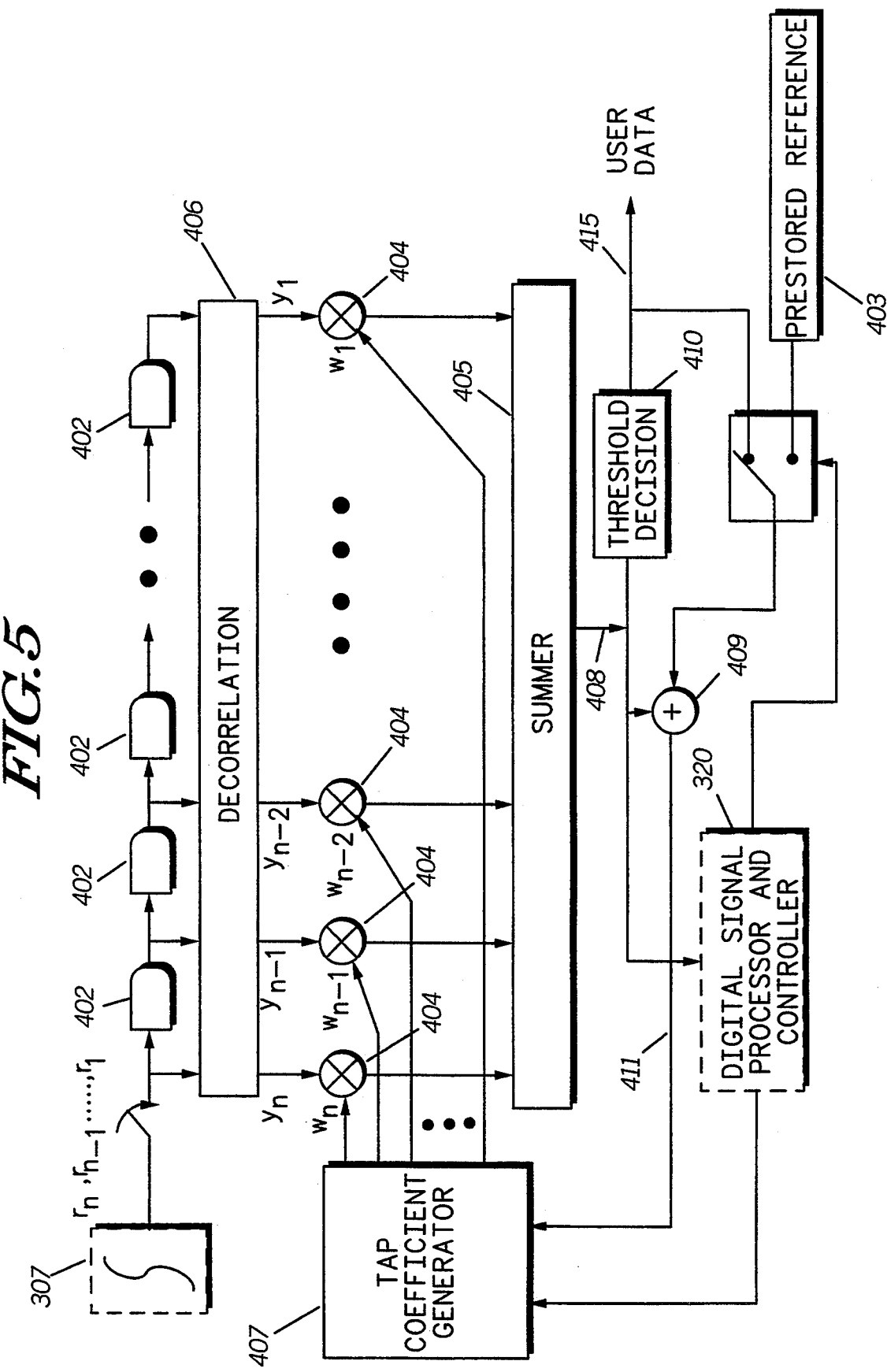
FIG. 5 is a block diagram of a spreading equalizer used in the receiver of FIG. 4.

Referring now to FIG. 5, a block diagram of the despreading equalizer 400 is shown. The equalizer 400 comprises an n-tap delay line equalizer where, as mentioned before, n is the number of chips per bit in the spreading chip sequence. The tap delay line consists of a bank of n-1 serially coupled flip-flops 402 with their outputs coupled to a corresponding number of multipliers 404. The bank of serially coupled flip-flops 402 operates as a shift register sequentially shifting at the chip rate, received samples $r_1, r_2, \ldots r_n$ which are provided at the output of the chip matched filter 307 during each bit interval. The received samples $r_1, r_2, \ldots r_n$ are herein represented by the received sample vector R whose mathematical expression is given by equation (1). It may be appreciated that because the training bit sequence and the interfering signals are coded with spreading chip sequences, the elements of the received sample vector R, i.e., $r_1$-$r_n$, are correlated with each other. According to the present invention, the received samples $r_1$-$r_n$ are de-correlated from each other to provide de-correlated elements based upon which the error between the received signal and the desired signal is minimized. As such, the outputs of the flip-flops 402 are applied to a de-correlator block 406 for de-correlating the received samples $r_1$-$r_n$ and for providing decorrelated elements $y_1, y_2, \ldots y_n$, which hereinafter are represented by a de-correlated vector Y. The de-correlator block 406 utilizes an orthogonal transformation algorithm to transform the received sample vector R. Well-known orthogonalization transformation algorithms may be used to de-correlate the received sample vector R. Such algorithms include eigen value transformation and Gram-Schmidt orthogonalization.

At the end of each bit interval, the multipliers 404 multiply the resulting de-correlated elements $y_1$-$y_n$ by tap coefficients $w_1, \ldots w_n$ as provided by a tap coefficient generator block 407. The tap coefficient $w_1, \ldots w_n$ is represented by the despreading vector W, the finding of which satisfies equation (2) and minimizes the error between the received signal as represented by the vector R and the desired signal $d_1$. The desired signal is represented in the equalizer 400 by a pre-stored reference bit sequence provided by block 403, which corresponds to the training sequence. A summer 405 sums the outputs of the multipliers 404 to provide the summer output 408. The summer's output 408 is applied to a comparator 409 and a threshold decision block 410. The threshold decision block 410 comprises a threshold comparator which, after the training interval, provides the detected bits of the user bit sequence. The threshold decision block 410 provides the equalizer output 415. The threshold detector decision block 410 determines the decoded bit state by comparing the summer output 408 with a bit state threshold level. It may be appreciated that the equalizer output 415 and the summer output 408 are related by a $(1/n)$ ratio therebetween. During training, the comparator 409 compares the summer's output 408 with the pre-stored reference bit sequence as provided by the block 403. The pre-stored reference sequence is a pre-determined reference signal representing uncoded training sequence. As such, the references sequence is also a signal with redundant consecutive and non-alternating sequences which is uncoded. The comparator 409 compares the pre-stored reference bit sequence with the summer output and provides an error signal 411 which is applied to a tap coefficient generator block 407. The tap coefficient generator block 407 uses either the Least Means Square (LMS) or Recursive Least Square (RLS) algorithm to update tap coefficients $w_1$-$w_n$ during each bit interval and to minimize the error signal 411. The despreading equalizer 400 updates the tap coefficient $w_1$-$w_n$ until the error signal between the detected bit sequence and the pre-stored training sequence is minimized and the received signal and the reference signal are substantially diverged and equalized. Once equalized, the transmitted training bit sequence and the pre-stored reference bit sequence, the tap coefficients $w_1$-$w_n$ become a representation of the despreading chip sequence or vector W which despread the DS-SS communication signal 30 and suppress multiple-access interfering signals without prior knowledge of the spreading chip sequence. As such, the vector W represents the despreading chip sequence. As explained before, the elements of the vector W are used to despread the received DS-SS communication signal after the training interval has terminated.

Figure 6:
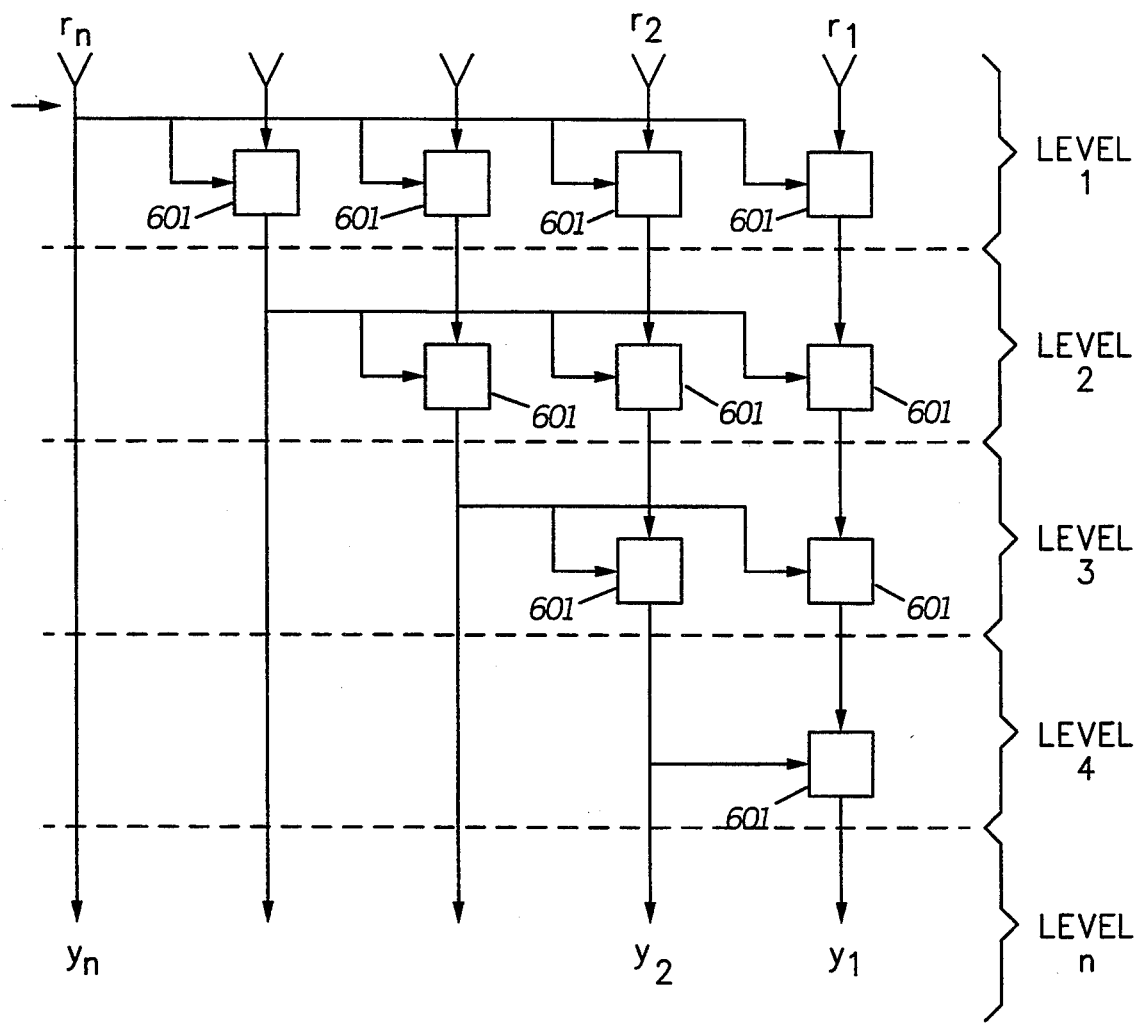
FIG. 6 is a block diagram of a de-correlator which uses Gram-Schmidt orthogonalization.

Referring to FIG. 6, block diagram of a preferred de-correlator 406 is shown. The de-correlator 406, according to the preferred embodiment of the invention, utilizes a parallel architecture for Gram-Schmidt orthogonalization which may be implemented using single or multiple digital signal processors. The Gram-Schmidt The de-correlator 406 receives an input comprising the correlated received samples $r_1$-$r_n$ and provides an output comprising de-correlated elements $y_1$-$y_n$. As is well known, the Gram-Schmidt de-correlation process de-correlates each received sample from the remaining samples in consecutive levels. The de-correlation process basically removes from one received sample the affects of the remaining elements at each level using well-known mathematical computations. In FIG. 6, the received sample vector R, is inputted and is orthogonalized on an element-by-element basis. Assuming 5 elements for vector R at the first level, the transformation is applied to the vector such that $r_1^1$ is orthogonal to the elements, $r_j^1$ for j from 2 through 5 (the superscripts represent the level of orthogonalization). This transformation may be expressed in a matrix form:

$$\begin{vmatrix} r_1^2 \\ r_2^2 \\ r_3^2 \\ r_4^2 \\ r_5^2 \end{vmatrix} = \begin{vmatrix} 1 & 0 & 0 & 0 & 0 \\ -w_2^1 & 1 & 0 & 0 & 0 \\ -w_3^1 & 0 & 1 & 0 & 0 \\ -w_4^1 & 0 & 0 & 1 & 0 \\ -w_5^1 & 0 & 0 & 0 & 1 \end{vmatrix} \begin{vmatrix} r_1^1 \\ r_2^1 \\ r_3^1 \\ r_4^1 \\ r_5^1 \end{vmatrix}$$

In the above matrix $w_j^1$ is set to:

$$w_j^1 = \frac{E[r_1^1 r_j^1]}{E[r_1^1 r_1^1]}$$

An element by element transformation continues at most for n times until all the output vector elements of the transformation are orthogonal to each other. Blocks 601 in FIG. 6 represent the computational processing that takes place at each level. The maximum number of de-correlating levels corresponds to the number of received samples(n).

It has been determined that when the number of the desired transmitter and the interfering transmitters is less than the number of chips, n, the correlation matrix of the received sample vector R is singular or nearly singular, that is, it includes zero or near-zero eigen values. As a result of the de-correlation process, the de-correlated elements may be divide into two groups: a first group corresponding to the desired DS-SS signal and the interfering DS-SS signals, and a second group of noise elements corresponding to noise. The second group of noise elements have much smaller values than those associated the first group.

Referring back to FIG. 5, the tap coefficient generator block 407 may use either one of LMS or RLS algorithms for generating the tap coefficients $w_1$-$w_n$. According to the invention, the tap coefficients $w_1$-$w_n$ are updated based on the de-correlated elements $y_1$-$y_n$. In the LMS algorithm, step sizes determine the convergent rate. As explained before, the maximum step size is determined based on the maximum signal power. Conventional equalization, which produce tap coefficient based on correlated received samples without de-correlating them, utilizes the same step size in conjunction with every received element. Therefore, when an interfering signal is much stronger than the desired signal, the step size is set to a small value and, thus, the convergent rate becomes very slow. In contrast, the present invention, which uses the de-correlated elements $y_1$-$y_n$, allows the step sizes to be independent from each other. According to the present invention, the de-correlated elements allow the LMS algorithm to identify signal power associated with each element and determine optimal step sizes in order to speed up the convergence rate. Preferably, de-correlated elements which are associated with noise may be disregarded in estimating the desired signal. Therefore, in the preferred embodiment of the invention, the error minimizing LMS algorithm utilizes the first group of de-correlated elements, i.e. those associated with the desired signal and those associated with the interfering signal while discarding the second group, i.e. the elements associated with noise, in order to estimate the desired signal. The LMS tap weight updating equation with present invention's independent step sizes for each vector element may be expressed by:

$$w_j(n+1) = w_j(n) - \Delta_j e_n r_j(n)$$

where $\Delta_j$ denotes a step size for the jth signal vector element.

Alternatively, the tap coefficient may be updated using the RLS algorithm. It is well known that the RLS algorithm utilizes the input correlation matrix of the vector R to minimize error. Generally, in the equalization process utilizing the RLS algorithm, the inverse of the input correlation matrix must be calculated. The inverse of the input correlation matrix cannot be calculated when the input correlation matrix is singular or near singular. Conventional equalization processes utilize the received sample vector R without de-correlating them, which usually result in near singular or singular input correlation matrixes. Because the de-correlation process of the present invention identifies the noise elements which result in near singular or singular matrixes, the RLS error minimization of the present invention utilizes only the first group of elements associated with the desired signal and the interfering signals for determining the input correlation matrix of the RLS algorithm and disregards the second groups of elements associated with noise. As such, the input correlation matrix of the error minimizing RLS algorithms comprises the first group of elements which results in non-zero diagonal elements.

It may be appreciated that the tap delay line equalizer 400 could be implemented within the digital signal processor 320 of the receiver 20. As such, the digital signal processor 320 may include the de-correlator block 406, the tap coefficient generator block 407, and other needed blocks implemented for achieving the purpose of the present invention. Alternatively, the equalizer 400 may be implemented utilizing conventional digital and logical discrete components as is well known in the art.

From the foregoing, it is apparent that the present invention substantially improves the convergent rate during equalization of the received signal and decoding thereof by performing a de-correlation process using orthogonal transformation. The de-correlation of the received samples identifies and avoids elements associated with noise. Consequently, the convergent rate of the error minimizing LMS or RLS is substantially accelerated by utilizing the information derived from decorrelation of the received samples.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a code division multiple access (CDMA) receiver which utilizes adaptive equalization for minimizing the error between a received DS-SS signal and a reference signal; a method for decoding the received signal comprising the steps of:
   a) receiving a DS-SS communication signal including a desired DS-SS signal, wherein said desired DS-SS signal comprises binary bits coded with a spreading chip sequence;
   b) sampling during a bit interval said received DS-SS communication signal to produce received samples, said received samples being correlated with each other;
   c) de-correlating the received samples by employing an orthogonal transformation algorithm to provide de-correlated elements corresponding to said received samples; and
   d) minimizing the error based on the de-correlated elements.

2. The method of claim 1, wherein said DS-SS communication signal is contaminated with interfering DS-SS signals and noise; and wherein said de-correlated elements comprises a first group of elements corresponding to the desired DS-SS signal and the interfering DS-SS signals and a second group of elements corresponding to noise, and wherein the step of minimizing the error is based on the first group of de-correlated elements.

3. The method of claim 1, wherein said step of de-correlating the sampled received elements comprises the step of employing Gram-Schmidt transformation.

4. The method of claim 2, wherein the step of minimizing error comprises the step of updating a number of tap coefficients of a tapped delay line equalizer (TDLE).

5. The method of claim 4, wherein the step of updating tap coefficients comprises employing least mean square (LMS) algorithm wherein optimum step sizes are independently determined for updating each tap coefficients of the TDLE.

6. The method of claim 4, wherein the step of updating the tap coefficients comprises employing recursive least square (RLS) algorithm.

7. An adaptive code division multiple access (CDMA) receiver which utilize adaptive equalization by minimizing the error between a received DS-SS communication signal and a reference signal comprising:
   means for receiving the DS-SS communication signal, said DS-SS communication signal including a desired DS-SS signal, wherein said desired DSSS signal comprises binary bits coded with spreading chip sequences
   a tapped delay line equalizer comprising:
      sampling means for sampling, during a bit interval, said received DS-SS communication signal to produce received samples, said received samples being correlated with each other;
      de-correlation means for de-correlating the received samples by employing an orthogonal transformation algorithm to provide de-correlated elements corresponding to said received samples
      error minimization means responsive to said de-correlated elements for minimizing the error between the reference signal and the received DS-SS communication signal.

8. The receiver of claim 7, wherein said received communication signal is contaminated with interfering DS-SS signals and noise; and wherein said de-correlated elements comprises a first group of elements corresponding to the desired DS-SS signal and the interfering DS-SS signal and a second group of elements corresponding to noise, and wherein said error minimization means is responsive to the first group of de-correlated elements for minimizing the error between the reference signal and the received DS-SS communication signal.

9. The receiver of claim 7, wherein said de-correlation means employs Gram-Schmidt transformation.

10. The receiver of claim 7, wherein the error minimization means further includes a tap coefficient generator for providing tap coefficients by employing least mean square (LMS) algorithm.

11. The receiver of claim 7, wherein the error minimization means further includes a tap coefficient generator for providing tap coefficients by employing recursive least square (RLS) algorithm.

* * * * *